United States Patent [19]
Yago et al.

[11] 3,797,984
[45] Mar. 19, 1974

[54] COLD SPRUE INJECTION MOLDING DEVICE WITH INTEGRAL SPRUE CHAMBER AND INJECTION NOZZLE

[76] Inventors: John Gerald Yago, 2325 Belvedere Dr., Toledo, Ohio 43614; Robert George Haas, 13483 Five Point Rd., Perrysburg, Ohio 43551; George Bruckner Rheinfrank, 228 E. Front St., Perrysburg, Ohio 43551

[22] Filed: July 25, 1972

[21] Appl. No.: 274,934

Related U.S. Application Data

[63] Continuation-in-part of Ser. No. 63,564, Aug. 13, 1970, abandoned.

[52] U.S. Cl.............. 425/243, 425/191, 425/247
[51] Int. Cl............................................. B29g 3/00
[58] Field of Search .......... 425/242, 243, 247, 447, 425/449, 191, DIG. 227, 251, 252, 192

[56] References Cited
UNITED STATES PATENTS

| | | | |
|---|---|---|---|
| 3,608,150 | 9/1971 | Laufer | 425/242 |
| 3,661,487 | 5/1972 | Susin | 425/191 |
| 2,420,709 | 5/1947 | Kopplin | 425/250 |
| 3,663,143 | 5/1972 | Fischer | 425/244 |

*Primary Examiner*—J. Spencer Overholser
*Assistant Examiner*—David B. Smith
*Attorney, Agent, or Firm*—Frank M. Van Reit

[57] ABSTRACT

There is provided a cold sprue injection molding device with a sprue chamber integral with the nozzle, together with suitable temperature controlling means, such as a liquid jacket, to maintain temperature in the sprue chamber sufficiently low so that with a thermosetting resin, the resin does not cure before injection at the parting line of a two-part split mold. Specifically, the device comprises a ram-type injection feeder means and means for maintaining a predetermined temperature in said feed means, said device being in contact with a split mold with means for maintaining molding temperatures therein. More specifically, the device comprises a plasticizing and sprue chamber and an injection nozzle as a single unit positioned to direct molding composition feed through the nozzle terminating at the parting line of a sprue chamber-free split mold, said sprue chamber-injection nozzle unit being positioned independent of the mold and being detachably removable therefrom, wherein the tip of the nozzle of said unit terminates at the parting line of the split mold; means for maintaining non-curing molding temperatures in said plasticizing and sprue chamber-injection nozzle unit, said means extending to a point from about one-eighth inch to one-half inch from the nozzle tip; and a split mold in which one of the two sections thereof contains partially positioned therein the said detachably removable sprue chamber-injection nozzle unit, said mold having means therein for maintaining curing temperatures for the molding composition.

1 Claim, 1 Drawing Figure

3,797,984
PATENTED MAR 19 1974
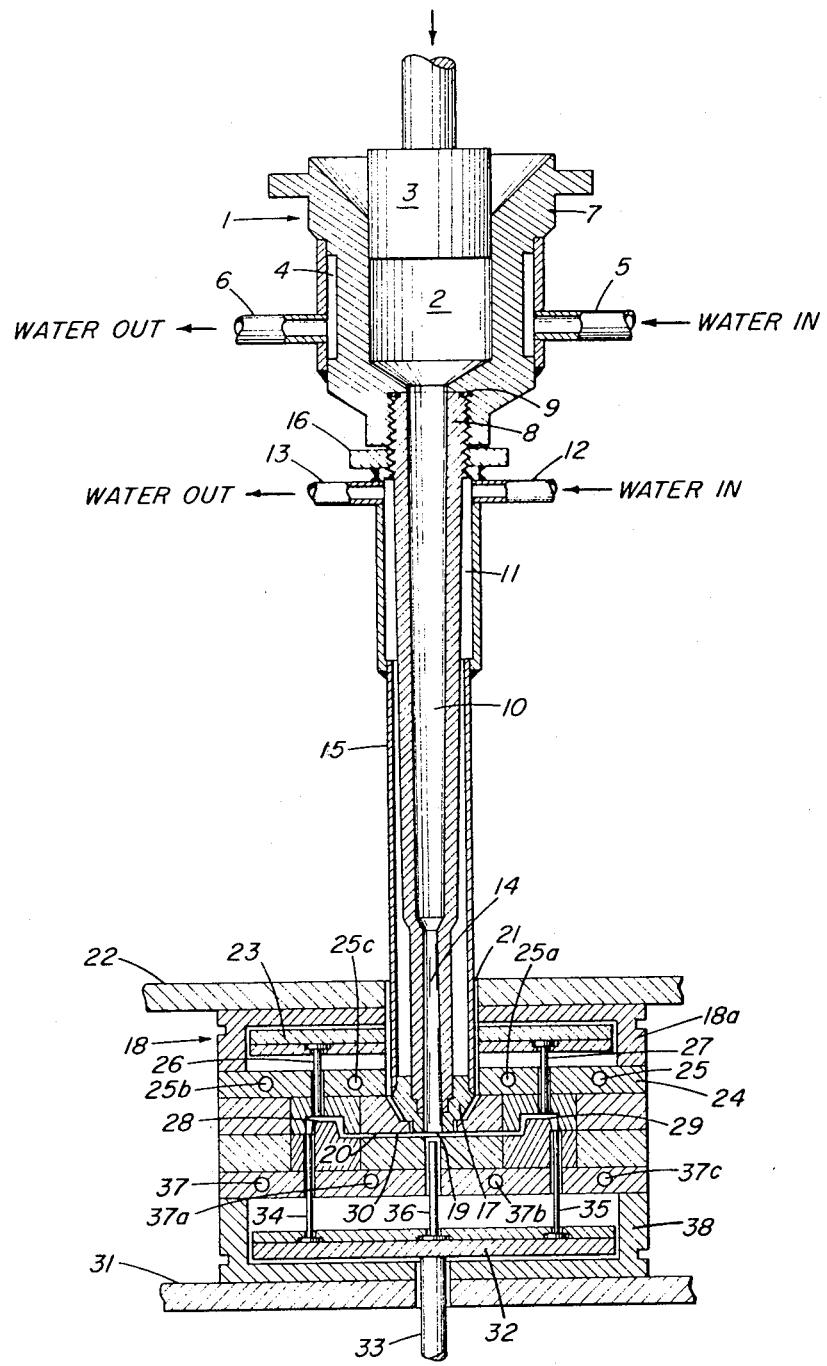

COLD SPRUE INJECTION MOLDING DEVICE WITH INTEGRAL SPRUE CHAMBER AND INJECTION NOZZLE

This application is a continuation-in-part of our co-pending application, Ser. No. 63,564, filed Aug. 13, 1970 now abandoned.

BACKGROUND OF THE INVENTION

Injection molding is used extensively, particularly with thermoplastic resins and thermosetting molding compositions. It has also been proposed to cool the injection mechanism so that the heating-up of the molding material as a result of friction and other heating conditions during injection will not cause the molding composition to prematurely cure when used with thermosetting molding composition. As is standard practice, the mold is provided with manifolds or a built-in sprue chamber into which the molding composition is injected, usually through a short runner and gate, although it has also been proposed to inject directly into the mold sprue chamber.

While it is not desired to allow premature curing in the sprue chamber, nevertheless, there is a problem of thermosetting resin flow because many thermosetting molding compositions will not flow at too low temperatures, albeit sometimes such temperatures are below rapid curing temperature. A balance must, therefore, be struck, and, of course, a curing temperature must be reached in the mold itself when thermosetting molding compositions are to be used. When the resin cures in the sprue chamber and the mold is opened, the resin formed in the sprue is wasted and presents a problem of removal both from the molded article and from the mold.

An interesting variant of the above-described injection molding device is described in the patent to Mac-Millin, U.S. Pat. No. 2,448,676, issued Sept. 7, 1948. In this patent, the chamber in which the injection plunger moves is maintained at desired temperature by a flow of liquid which, in the case of thermosetting compositions, may result in cooling or at least controlling the temperature. After injection through the injection nozzle directly into the sprue chamber of a mold, heat is supplied to the composition by high frequency heating. In order to control the heating in the resin or at least prevent gradual heating-up of the mold dies, the latter may be cooled by liquid flow.

In all of the injection molding devices, including that of the MacMillin patent, the problems of a separate sprue chamber and manifolds in the mold are still present, and cleaning out the sprue chamber in the mold presents a troublesome and time-consuming problem since the molding press has to be shut down for cleansing. As a result, there is a definite limit on the output for any given shape of molded material, and control of the plasticity of the material in the sprue chamber is more difficult.

SUMMARY OF THE INVENTION

The present invention permits greatly increased speed and better control of material plasticity by a plasticizing and sprue chamber, the temperature of which is controlled, if necessary, by cooling, which chamber is integral with the portion of the injecting device carrying the injection nozzle. The latter injects directly into the mold along a runner leading to a mold cavity, e.g., at the parting line thereof, without first passing through sprue chambers or manifolds in a two-part split mold. With thermosetting compositions, the temperature can be maintained accurately at just the right point for adequate plasticity without risk of undue curing. Temperature control, say between 150°F. and 200°F., is effected in the combined nozzle and sprue chamber portion of the injection-feeder device. This temperature means, which extends to from about ⅛ inch to about 1 inch from the nozzle tip, is entirely independent of the temperature in the mold, which mold can be operated at a much higher temperature, say between 350°F. and 400°F. This permits faster curing and greatly increased output. This cannot be effected in the normal type of mold without experiencing excessive premature curing in the sprue chamber and injection nozzle.

It is an advantage of the apparatus of the invention that, since the injection nozzle is introduced directly into the mold at the parting line thereof, there is no leakage of material between the injection nozzle and the mold even at very high injection pressures. It is a further advantage of the invention that direct injection at the parting line of the mold permits more rapid filling of mold cavities through a relatively short runner and contributes also to increased output which is made possible by operating the mold itself at a considerably higher temperature than could be achieved with a mold in which the sprue chamber is a portion of the mold. An additional advantage is that it is easier to clean sprue sections where there may have been small amounts of cured material building up in intermittent use. Since the sprue chamber can be vented directly to the atmosphere, any such cleaning can be effected without disassembly of the mold. This reduces down-time and further contributes to increased output.

A further advantage derived from the apparatus of the invention is that, since the nozzle and sprue chamber while integral in the sense that the nozzle is a part of the sprue chamber, can be optionally changed as the latter chamber can be threaded into the portion of the apparatus in which the plunger forces molding composition, and so different injection nozzle shapes and sizes and nozzle-sprue chamber designs can be interchanged readily and rapidly. This advantage makes possible combined sprue chamber and injection nozzles as a separate fitting for existing molding composition feeds, and wide variations can be achieved with the same feeding mechanism without requiring extensive rebuilding of the overall apparatus. All of this is achieved with the other major advantages of the present invention, namely, eliminating sprue chamber waste, better control of plasticity of the material, independent temperature control within the nozzle, and the other factors leading to higher output.

The combined or integral nozzle and sprue chamber is an inexpensive device and can, in many cases, be produced at a considerably lower cost than is required where a sprue chamber has to be built or incorporated into a mold. This is particularly advantageous where the present invention is to be used with molds for very widely differing molded parts, as in each case the mold is a simple mold with no built-in sprue chamber. Good versatility can be obtained at minimal cost. While various molds can be used with the present invention, it should be understood that when a particular mold is being used, it in fact forms a portion of the organization of the present invention.

In the more specific description of preferred embodiments of the invention which will follow below, the feeding means for molding compositions will be shown semidiagrammatically as its general nature is not changed by the present invention. This is a real, practical operating advantage and makes possible, as has been mentioned above, the use of the combined or integral plasticizing-sprue chamber-nozzle as an attachment for existing injection molding machines. Of course, if a machine is to be used only with a particular molding composition, the plasticizing-sprue chamber-nozzle can, if desired, be made an integral portion of the molding composition feed mechanism. However, the advantages of being able to change nozzles makes the detachable form preferable. As this can be effected with strong and rugged connections, the versatility is obtained without adverse effects on the ruggedness of the apparatus as a whole.

Advantageously, mold design is also not changed by the present invention, except that it is simplified by eliminating any sprue chamber in the mold, and it is a further advantage of the present invention that it can be used with any mold construction. For this reason, in the more specific description to follow below, the mold itself is shown with minimal details, noting particularly the elimination of a sprue chamber therein.

The present invention is useful with practically any thermosetting molding composition, together with proper fillers or other constituents for a particular use. Thus, it is possible to mold thermosetting compositions of phenolics, aminoplasts, either urea- or melamine-formaldehyde, and the like. By reason of the accurate control of temperature and the other advantages set out above, the present invention is particularly suitable for injection molding of compositions in which the resin is a thermosetting polyester resin, such as an alkyd resin; but, of course, the present invention is primarily an apparatus and is, therefore, not limited to any particular thermosetting material which is to be injection molded by it.

Reference has been made above to cooling the plasticizing-sprue chamber, which is an integral part of the nozzle portion of the device; and for many thermosetting resins, such as polyesters, this involves the use of liquids which maintain the temperature below that at which premature or excessive curing takes place. However, certain compositions, such as some phenolic compositions, require higher temperatures in order to permit satisfactory plasticity or flow. In such cases, the jacket may carry a fluid which serves primarily for heating; and if the temperature is too high for water, it may be necessary to use a higher boiling fluid, such as a higher boiling oil.

It will be noted that the improved structure of the present invention retains all of the advantages of metered injection with a definite time-pressure relationship. Also, excessive pressure in the mold during curing is not necessary. The system of the present invention eliminates substantially any cull as well as material waste due to sprue formation.

BRIEF DESCRIPTION OF THE DRAWINGS

The drawings represent a section through an integral plasticizing-sprue chamber-injection nozzle and a two-part split mold.

DESCRIPTION OF THE PREFERRED EMBODIMENTS

In the drawing, portions of which are semidiagrammatic in nature where they deal with elements that are not substantially changed by the present invention, 1 is generally shown as a ram-type injection feeder. A chamber 2 is shown in which a plunger 3 moves to compress a thermosetting resin composition, such as one containing a thermosetting alkyd resin. This portion of the apparatus is temperature controlled by water in a jacket 4 with a water inlet 5 and outlet 6. Referring to chamber 2, it is provided with a means for introducing the thermosetting resin composition. This means is not shown in detail, since this portion of the apparatus is of more or less standard design and is shown primarily to locate the essential feature of the present invention, namely, the sprue chamber and injection nozzle.

The chamber body 7 is internally threaded and receives an externally threaded element 8, which is screwed in tight, making a tight seal by means of the gasket or O-ring 9. The chamber 2 is extended as a plasticizing chamber 10, the temperature of which is controlled by the water jacket 11 with water inlet 12 and outlet 13. The chamber 10 is sufficiently long in length so that the thermosetting composition can be brought to the proper plasticity. The plasticizing chamber 10 then continues with a reduced diameter to form the sprue chamber 14. These comprise an overall chamber which is also temperature controlled by the water jacket, the outside of the jacket 15 being provided with an insert 16 which is welded to it and which screws onto the threads of the externally threaded element 8. On the end of the sprue chamber 14 which is tapered at the discharge end abutting the mold parting line to permit ready ejection of any cured material in the sprue section, and the jacket 15, there is provided a nozzle designated at 17. A tight connection is provided by the shoulder shown. As soon as the element 8 is screwed into the chamber body 7, in effect, the plasticizing chamber 10, the sprue chamber 14, and nozzle 17 form an integral part of the ram-feeding mechanism.

The nozzle 17 is pressure-fitted into a two-part mold shown generally at 18. The nozzle tip 19 abuts the mold parting line 20 at all times during molding. As shown, the ram-feeding mechanism is separated from the mold by an air gap 21 and is further held secure at the parting line of the mold by means of the ram pressure.

The two-part mold 18 generally comprises: (A) a stationary press platen 22 supporting an ejector box (18a) and a spring-loaded knock-out plate 23 attached to a mold cavity back-up plate at 24 through which electrical heaters are inserted at 25, 25a, 25b, and 25c. Knock-out pins 26 and 27 are attached to the knock-out plate 23 for purposes of dislodging the molded article in the mold cavities 28 and 29. There is also provided a relatively short runner 30 adjacent to the nozzle of the ram-injection feeder, and (B) a movable press platen 31 supporting an ejector box 38 and attached to a knock-out plate 32 which is activated by a knock-out activator 33. Attached to the knock-out plate are knock-out pins 34 and 35 as well as sucker pin 36. The second half of the two-part mold is provided with heating elements, 37, 37a, 37b, and 37c.

In operation, the chamber 2 is filled with a suitable molding composition, as for example, a thermosetting, glass fiber, mineral-filled, alkyd resin molding composition. The injection nozzle 17, which is held against the face of the mold parting line through pressure on the ram-feeding mechanism throughout the molding cycle, and from cycle to cycle, remaining in that position during molding, is then inserted into a two-part mold 18. The mold is devoid of any manifold or built-in sprue chamber and is generally well adapted for molding small parts with an 0.08-inch cross-section. The mold per se is maintained at a suitable curing temperature, usually ranging from 350°F. to 450°F.

The thermosetting composition is introduced in a fraction of a second at a temperature of about 150°F. by movement of the plunger 3 driven in conventional manner by a drive which is not shown. The thermosetting alkyd resin-filler composition is maintained at about 150°F. by the water jackets 4 and 11. The latter extends to about one-eighth inch to one-half inch from the nozzle tip. The temperature is sufficient to maintain suitable plasticity for injection but is low enough to prevent undue precuring in the sprue chamber. With the small parts of thin cross-section, production of over 600 molding cycles per hour can be maintained. The mold, which is of standard split construction, of course, opens when a molded part has been cured and is ejected by knock-out pins and sucker pins as shown. The fact that the ram-type injection feeder of the present invention can be incorporated into molds of standard construction is a practical advantage and permits the ready removal or changing of the sprue chambers and injection nozzles when such changes are required. This flexibility makes the removable feature highly desirable in most instances.

In spite of the fact that the pesent invention substantially eliminates unwanted curing in the cooled sprue chamber, in intermittent operation some cured material can accumulate. In such a case, the ram-injection feeder can be readily withdrawn from the parting line of the mold, and any cured or partially cured sprue material is forced out through the injection nozzle tip which makes elaborate cleaning of the sprue chamber unnecessary.

The present invention is an improvement in an injection molding apparatus and, as such, is not particularly concerned with the materials of construction of the integral sprue chamber and injection nozzles. They must, of course, be suitable and are usually of metals of the required strength which are not attacked or corroded by the particular molding compositions used. In some cases, the sprue chamber and injection nozzle tip may be fabricated of stainless steel. The water jacket, of course, does not need to resist such high pressures and may be of different material or it may be cast integrally as part of the sprue chamber-injection nozzle unit.

In a preferred modification of the present invention wherein the plasticizing-sprue chamber-injection nozzle unit is detachably connected to the molding composition feed portion of the apparatus, it is also possible to clean out the chamber 2 if the molding composition is changed. This is effected in the same manner as has been described above for removing cured or partially cured material from the sprue chamber by means of the plunger 3. This added convenience is in addition to the other advantages of a removably attached sprue chamber-injection nozzle unit and results without any additional elements.

We claim:

1. A ram-type injection molding apparatus adapted for use with thermosetting molding compositions comprising
   1. a ram-type injection molding feeder means,
   2. cooling means for maintaining a predetermined temperature below the curing temperature of the thermosetting resin in said feeder means,
   3. a split mold with heating means for maintaining molding temperatures therein and free of any sprue chamber therein,
   4. an elongated, plasticizing-sprue chamber and an injection nozzle as a single unit positioned so as to direct thermosetting resin through the nozzle and terminating at the parting line of said split mold,
   5. cooperating threaded means on said feeder means and the sprue chamber-injection nozzle unit whereby they may be united and the sprue-chamber injection nozzle unit may be removed and replaced,
   6. said plasticizing sprue-chamber-injection nozzle unit being (i) positioned in a manner independent of the mold with an air gap between said unit and said mold, (ii) secured to said mold by pressure and (iii) detachably removable from said mold, the tip of the nozzle of said unit terminating at the parting line of the split mold,
   7. means for securing the nozzle tip to the parting line and,
   8. temperature means for maintaining non-curing molding temperatures in said sprue chamber-injection nozzle unit comprising a surrounding liquid jacket along the length of said unit extending to from about one-eighth inch to one-half inch from said nozzle tip.

\* \* \* \* \*

UNITED STATES PATENT OFFICE
CERTIFICATE OF CORRECTION

Patent No. 3,797,984          Dated March 19, 1974

Inventor(s) John Gerald Yago, Robert George Haas and George Bruckner Rheinfrank

It is certified that error appears in the above-identified patent and that said Letters Patent are hereby corrected as shown below:

After listing the inventors and their addresses insert
-- Assignee: American Cyanamid Company, Stamford, Connecticut --.

Signed and sealed this 19th day of November 1974.

(SEAL)
Attest:

McCOY M. GIBSON JR.
Attesting Officer

C. MARSHALL DANN
Commissioner of Patents